(12) United States Patent
Roder et al.

(10) Patent No.: US 10,846,952 B2
(45) Date of Patent: Nov. 24, 2020

(54) SYSTEMS AND METHODS FOR MONITORING WHEEL HUB TEMPERATURES AND ODOMETRY IN TRAILER AXLES

(71) Applicant: Robert Bosch GmbH, Stuttgart (DE)

(72) Inventors: Jeffrey M. Roder, Novi, MI (US); Trevor P. Hunt, Farmington Hills, MI (US); Daniel S. Maitlen, Farmington Hills, MI (US); Travis D. Hunt, Grand Blanc, MI (US)

(73) Assignee: ROBERT BOSCH GMBH, Stuttgart (DE)

( * ) Notice: Subject to any disclaimer, the term of this patent is extended or adjusted under 35 U.S.C. 154(b) by 282 days.

(21) Appl. No.: 15/775,872

(22) PCT Filed: Oct. 26, 2016

(86) PCT No.: PCT/EP2016/075732
§ 371 (c)(1),
(2) Date: May 14, 2018

(87) PCT Pub. No.: WO2017/072143
PCT Pub. Date: May 4, 2017

(65) Prior Publication Data
US 2018/0330556 A1 Nov. 15, 2018

Related U.S. Application Data (60) Provisional application No. 62/248,611, filed on Oct. 30, 2015.

(51) Int. Cl.
*G01K 1/08* (2006.01)
*G07C 5/08* (2006.01)
(Continued)

(52) U.S. Cl.
CPC ........ *G07C 5/0808* (2013.01); *B60B 27/0068* (2013.01); *F16C 19/525* (2013.01);
(Continued)

(58) Field of Classification Search
None
See application file for complete search history.

(56) References Cited

U.S. PATENT DOCUMENTS

| 3,792,434 A | 2/1974 | Williams |
| 6,011,827 A | 1/2000 | Kyrtsos |

(Continued)

FOREIGN PATENT DOCUMENTS

| CA | 2200647 A1 | 9/1998 |
| CA | 2232053 A1 | 9/1998 |

(Continued)

OTHER PUBLICATIONS

Office Action from the Australian Patent Office for Application No. 2016344639 dated Nov. 6, 2018 (3 pages).
(Continued)

*Primary Examiner* — Alessandro V Amari
*Assistant Examiner* — Nasir U. Ahmed
(74) *Attorney, Agent, or Firm* — Michael Best & Friedrich LLP (57) ABSTRACT

A system and method for monitoring wheel hub temperatures and odometry in trailer axles. The system includes a spindle (118), an inner bearing (114), an outer bearing (116), a wheel hub (106) engaging the spindle (118) via the inner and outer bearings (114, 116), a thermocouple (108) positioned within the spindle (118), and an electronic control unit (112). The electronic control unit (112) is electrically coupled to the thermocouple (108) and configured to receive from the thermocouple (108), a temperature signal. The electronic control unit (112) is configured to determine, from
(Continued)

TRAILER WHEEL HUB WITH THERMOCOUPLE the temperature signal, a temperature. The electronic control unit (112) is configured to compare the temperature to a predetermined threshold. The electronic control unit (112) is configured to, when the temperature exceeds the predetermined threshold, indicate a fault.

18 Claims, 6 Drawing Sheets

(51) Int. Cl.
*B60B 27/00* (2006.01)
*F16C 41/00* (2006.01)
*F16C 19/52* (2006.01)
*F16C 19/54* (2006.01)
*G01K 3/00* (2006.01)
*G01K 13/08* (2006.01)
*G01C 22/00* (2006.01)
*G01K 1/02* (2006.01)
*G07C 5/00* (2006.01)
*B60B 35/02* (2006.01)

(52) U.S. Cl.
CPC .......... *F16C 19/548* (2013.01); *F16C 41/008* (2013.01); *G01C 22/00* (2013.01); *G01K 1/024* (2013.01); *G01K 3/005* (2013.01); *G01K 13/08* (2013.01); *G07C 5/008* (2013.01); *G07C 5/0825* (2013.01); *B60B 35/02* (2013.01); *B60B 2900/3316* (2013.01); *B60Y 2200/147* (2013.01); *F16C 2233/00* (2013.01); *F16C 2326/02* (2013.01)

(56) References Cited

U.S. PATENT DOCUMENTS

| | | | |
|---|---|---|---|
| 6,286,992 B1 | 9/2001 | Kyrtsos | |
| 6,971,257 B1* | 12/2005 | Evans | G01N 3/56 73/7 |
| 8,919,401 B2* | 12/2014 | Sonzala | B60C 23/003 152/415 |
| 2002/0167401 A1* | 11/2002 | Hayes | G01M 13/04 340/449 |
| 2008/0084289 A1 | 4/2008 | White et al. | |
| 2012/0109500 A1* | 5/2012 | Beer | F02D 41/068 701/103 |
| 2013/0231854 A1 | 9/2013 | Rovik et al. | |

FOREIGN PATENT DOCUMENTS

| | | |
|---|---|---|
| EP | 1256792 A2 | 11/2002 |
| GB | 1604990 A | 12/1981 |
| JP | 2006317361 A | 11/2006 |
| WO | 2015071022 A1 | 5/2015 |

OTHER PUBLICATIONS

International Search Report and Written Opinion for Application No. PCT/EP2016/075732 dated Jan. 20, 2017, (11 pages).
Notice of Acceptance for patent application from the Australian Patent Office for Application No. 2016344639 dated Jun. 28, 2019 (3 pages).
Examination Report from the European Patent Office for Application No. 16787438.7 dated Apr. 21, 2020 (8 pages).

* cited by examiner

SYSTEMS AND METHODS FOR MONITORING WHEEL HUB TEMPERATURES AND ODOMETRY IN TRAILER AXLES

FIELD

Embodiments relate to the field of automotive control systems.

BACKGROUND

Towed trailers, including cargo trailers, boat trailers, campers, recreational vehicles, and the like, ride on non-powered, fixed (i.e., non-rotating) axles. Spindles are affixed to the ends of the axles, and wheel hubs rotate around the spindles using wheel bearings (for example, tapered roller bearings). The wheel bearings prevent the wheel hub from making contact with the spindle, and allow the wheel hub to freely rotate.

DETAILED DESCRIPTION

Most wheel bearings in wheel hubs require lubrication to function properly. When the lubricant (for example, grease) is present in sufficient quantities, free from contamination, and in suitable condition (for example, it has a viscosity appropriate to the wheel bearing it is lubricating), the friction in the wheel hub will be reduced to an acceptable level. This reduced friction ensures that the wheel turns smoothly and heat levels are kept low. However, when the lubricant is contaminated (for example, with dust or water), is not present in sufficient quantities (for example, due to leakage or wear), or is no longer suitable (for example, due to age), the friction in the wheel hub will increase. Increased friction leads to increased heat, which causes the lubricant to break down (that is, to lose viscosity). As the lubricant breaks down, friction increases, which leads to increased heat. As the heat and friction increase, so does wear of the wheel bearings and hubs. Wear may cause the wheel bearings to fail, and the wheel hub to seize. Before the wheel bearings fail, they may exhibit other warning signs, such as vibration or noise. However, by the time the wheel bearings begin to exhibit such sign, they are damaged to the point where they must be replaced. Replacing wheel bearings, or a seized wheel hub and spindle, is more costly than replacing the contaminated, missing, or unsuitable lubricant. Accordingly, there is a need for systems and methods for monitoring wheel hub temperatures and odometry in trailer axles.

One exemplary embodiment provides a wheel hub monitoring system. The system includes a spindle, an inner bearing, an outer bearing, a wheel hub engaging the spindle via the inner and outer bearings, a thermocouple positioned within the spindle, and an electronic control unit. The electronic control unit is electrically coupled to the thermocouple and configured to receive from the thermocouple, a signal indicative or a temperature. The electronic control unit is configured to compare the temperature to a predetermined threshold. The electronic control unit is configured to, when the temperature exceeds the predetermined threshold, indicate a fault.

Another exemplary embodiment provides a method for monitoring a wheel hub of a trailer. The method includes receiving, by an electronic control unit, from a thermocouple positioned within a spindle, a signal indicative of a temperature. The method includes comparing the temperature to a predetermined threshold. The method includes, when the temperature exceeds the predetermined threshold, indicating a fault.

Another exemplary embodiment includes a display device. The device includes a transceiver, a display screen, and a display processor coupled to the transceiver and the display screen. The display processor is configured to establish a wireless data connection with an electronic control unit. The display processor is configured to receive, from the electronic control unit, a fault command based on a temperature determined by a thermocouple positioned in a spindle corresponding to a wheel hub. The display processor is configured to display, on the display screen, a fault indication based on the fault command.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting, and coupling. Further, "connected" and "coupled" are not restricted to physical or mechanical connections or couplings, and can include electrical connections or couplings, whether direct or indirect. Also, electronic communications and notifications may be performed using any known means including wired connections, wireless connections, etc.

It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects of the invention may be implemented in software (for example, stored on non-transitory computer-readable medium) executable by one or more processors. As such, it should be noted that a plurality of hardware and software based devices, as well as a plurality of different structural components may be utilized to implement the invention. For example, "control units" and "controllers" described in the specification can include one or more processors, one or more memory modules including non-transitory computer-readable medium, one or more input/output interfaces, and various connections (for example, a system bus) connecting the components.

For ease of description, some or all of the exemplary systems presented herein are illustrated with a single exemplar of each of its component parts. Some examples may not describe or illustrate all components of the systems. Other exemplary embodiments may include more or fewer of each of the illustrated components, may combine some components, or may include additional or alternative components.

Figure 1:
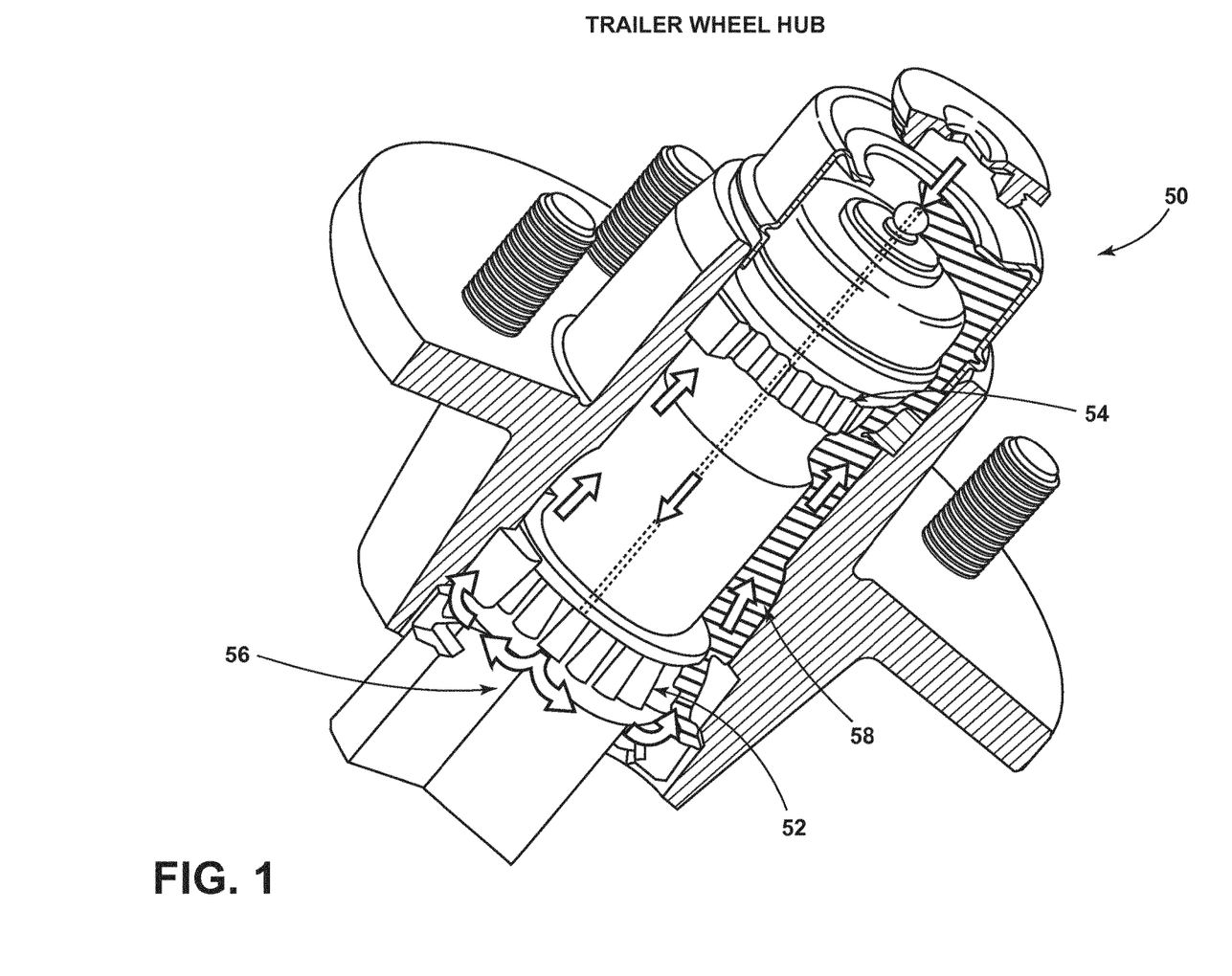
FIG. 1 is a cutaway view of a trailer wheel hub.

FIG. 1 an exemplary embodiment of a trailer wheel hub 50. The wheel hub 50 includes an inner bearing 52 and an outer bearing 54, which allow the wheel hub 50 to freely rotate around a spindle 56. As illustrated, lubricant 58 enters the wheel hub through the center of the spindle 56, and flows in the directions indicated by the arrows in FIG. 1 to lubricate the wheel bearings (i.e., the inner bearing 52 and the outer bearing 54). As described above, wheel bearings can fail under certain conditions. Before the wheel bearings fail, they may exhibit warning signs, such as vibration or noise. However, before they wheel bearings are damaged to the point where they exhibit such signs, the heat generated by the wheel hub 50 during operation will increase. By detecting this heat, and alerting an operator of the trailer, the lubricant 58 can be replaced before the wheel bearings are irreparably damaged or the wheel hub 50 seizes.

Figure 2:
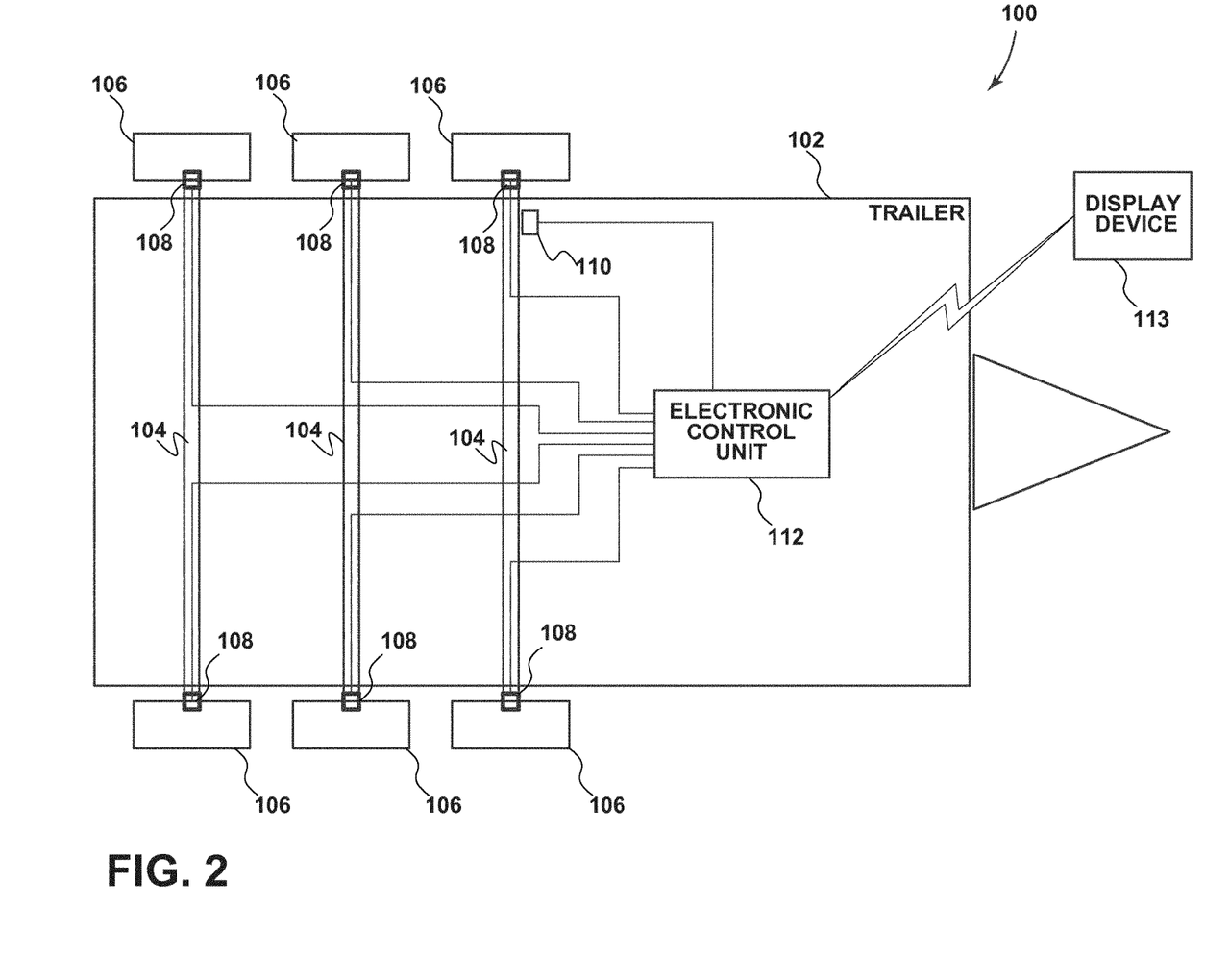
FIG. 2 is block diagram of a system for monitoring the temperature of wheel hub bearings in a trailer, according to some embodiments.

FIG. 2 illustrates an exemplary embodiment of a wheel hub monitoring system 100 for monitoring the temperature of wheel hub bearings in a trailer 102. The trailer 102 includes axles 104, each having two wheel hubs 106. As illustrated, the trailer 102 has three axles. In alternative embodiments the trailer may have more or fewer axles. Each wheel hub includes a thermocouple 108. A wheel speed sensor 110 is coupled to one of the wheel hubs 106 such that it can sense the speed of the wheel on the hub. Alternative embodiments may include an accelerometer or other sensor capable of detecting the rotation of the one or more of the wheels 106. The thermocouples 108 and the wheel speed sensor 110 are electrically coupled to an electronic control unit (ECU) 112. The thermocouples 108 detect the temperature of the wheel hubs 106, convert the temperature into electrical signals, and transmit the signals to the ECU 112. The ECU 112 is configured to receive the electrical signals, convert the electrical signals to temperature data, and transmit the temperature data to the display device 113, via a wireless or wired connection. The wheel speed sensor 110 senses, using, for example, a Hall Effect sensor, the rotation of the wheel hub 106, and converts the rotation into electrical signals, which it transmits to the ECU 112. The ECU 112 is configured to receive the electrical signals, convert them to rotation data, and transmit that data to the display device 113. Thermocouples and wheel speed sensors are conventional, and will not be described in detail. In some embodiments, the thermocouple 108 and/or the wheel speed sensor 110 may be components of one or more integrated sensor and control modules, which may communicate to the ECU 112 using wired or wireless connections.

Figure 3:
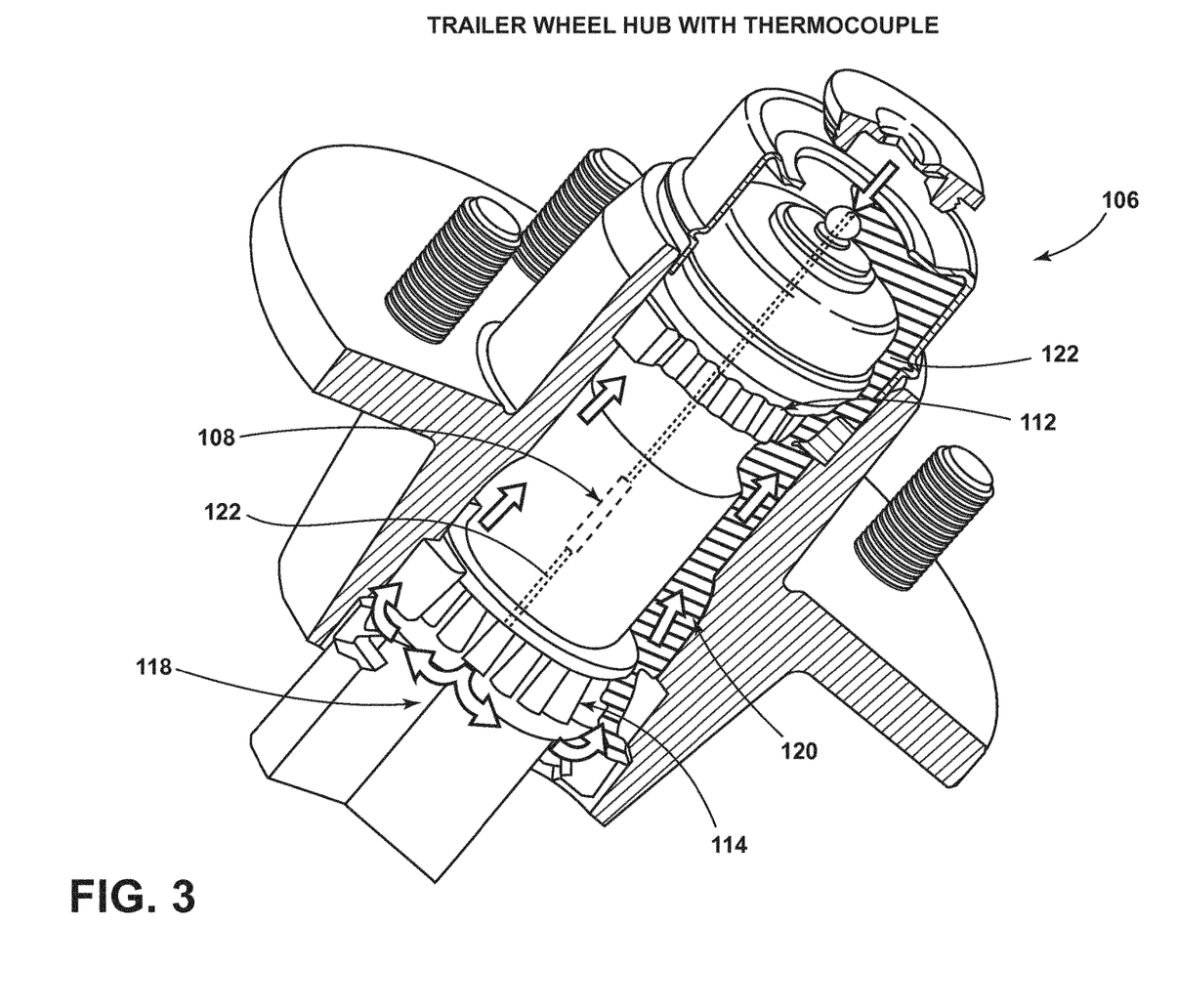
FIG. 3 is a cutaway view of a trailer wheel hub, according to some embodiments.

FIG. 3 illustrates an exemplary embodiment of a wheel hub 106. The wheel hub 106 operates similarly to the wheel hub 50, described above, but includes a thermocouple 108. Both the inner bearing 114 and the outer bearing 116 (i.e., the wheel bearings) are capable of generating friction, and thus heat. Accordingly, in the illustrated embodiment, the thermocouple 108 is positioned in the spindle 118 substantially equidistant to the inner bearing 114 and the outer bearing 116. In such position, the readings from the thermocouple 108 would likely not be influenced more or less by either wheel bearing. In one embodiment, the spindle 118 is drilled out to accommodate the thermocouple 108, which is press fit in the spindle. In alternative embodiments, other suitable methods of placement of the thermocouple 108 may be used. Lubricant 120 flows through one or more lubricant channels 122 to lubricate the components of the wheel hub 106. The lubricant channels 120 in the spindle 118 may have to be re-routed to accommodate placement of the thermocouple 108. In alternative embodiments, the thermocouple 108 may be positioned differently.

Figure 4:
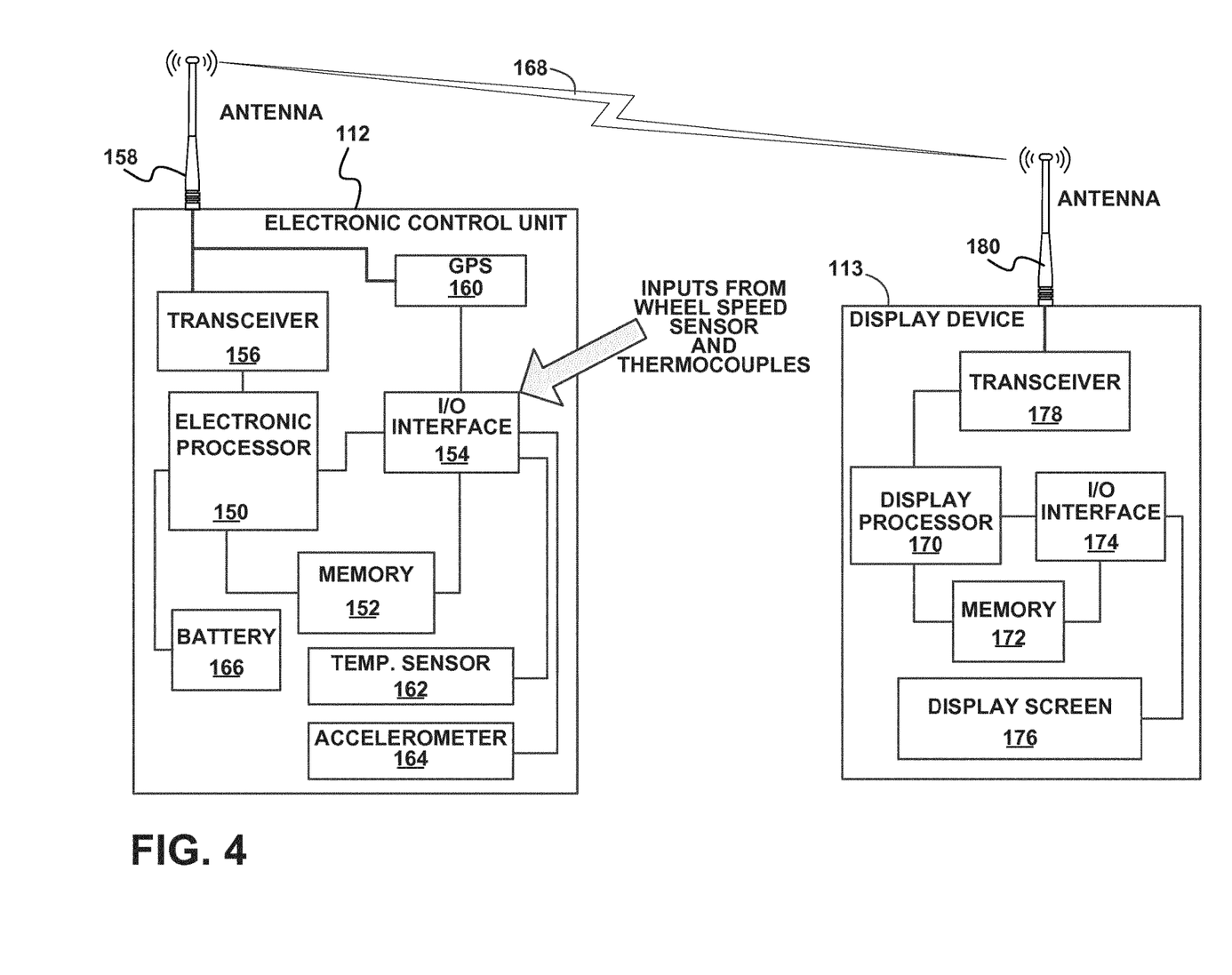
FIG. 4 is a block diagram of the electronic control unit and the display device of the system of FIG. 2, according to some embodiments.

FIG. 4 illustrates an exemplary embodiment of the ECU 112. The ECU 112 includes an electronic processor 150, a memory 152, an input/output interface 154, a transceiver 156, an antenna 158, a GPS receiver 160, a temperature sensor 162, an accelerometer 164, and a battery 166. The electronic processor 150, memory 152, input/output interface 154, transceiver 156, antenna 158, GPS receiver 160, temperature sensor 162, accelerometer 164, and battery 166, as well as the other various modules are coupled to each other by or through one or more control or data buses that enable communication therebetween. The use of control and data buses for the interconnection between and communication among the various modules and components would be known to a person skilled in the art in view of the invention described herein.

The memory 152 may include read-only memory (ROM), random access memory (RAM), other non-transitory computer-readable media, or a combination thereof. The electronic processor 150 is configured to retrieve instructions and data from the memory 152 and execute, among other things, instructions to perform the methods described herein. The input/output interface 154 is configured to receive input and to provide output. The input/output interface 154 obtains information and signals from, and provides information and signals to (for example, over one or more wired and/or wireless connections), devices both internal and external to the ECU 112. For example, as described in detail below, the electronic processor 150 is configured to receive data from the thermocouples 108, convert that data to temperature information, and determine whether the temperature values are outside of an acceptable operating range. In another example, the electronic processor 150 is configured to receive data from the wheel speed sensor 110, convert that data into a distance traveled, and store an odometer value for the trailer in a non-volatile memory.

The transceiver 156 establishes, using antenna 158, a wireless data connection 168 with the display device 113 using a suitable wireless modality, for example, a short-range wireless network protocol (for example, a Bluetooth® standard protocol). In alternative embodiments, the ECU 112 and the display device 113 are coupled with a wired connection.

The GPS receiver 160 is electrically coupled to the antenna 158, or another dedicated antenna (not shown) to receive GPS signals and provide the electronic processor 150 with information on the location, elevation, speed, and direction of the GPS receiver 160 (and, thus, the trailer 102). The GPS receiver 160 is conventional, and will not be described in detail.

The temperature sensor 162 is capable of sensing the ambient temperature around the trailer 102. The accelerometer 164 is capable of sensing the acceleration of the trailer 102. The temperature sensor 162 and the accelerometer 164 are conventional, and will not be described in detail. The battery 166 provides power to the components of the ECU 112. In one exemplary embodiment, the ECU 112 is sealed, and the battery 166 is a "lifetime battery." In alternative embodiments, the battery 166 is replaceable or rechargeable using suitable systems (for example, power supplied by a towing vehicle).

FIG. 4 also illustrates an exemplary embodiment of the display device 113. The display device 113 includes a display processor 170, a memory 172, an input/output interface 174, a display screen 176, a transceiver 178, and an antenna 180, that, along with other various modules and components, are coupled to each other by or through one or more control or data buses, which enable communication therebetween. The memory 172 may include a program storage area (for example, read only memory (ROM)) and a data storage area (for example, random access memory (RAM)), and another non-transitory computer readable medium. The display processor 170 may be a microprocessor or similar electronic device, is coupled to the memory 172, and executes computer readable instructions ("software") stored in the memory 172. For example, software for performing methods as described hereinafter may be stored in the memory 172. The software may include one or more applications, program data, filters, rules, one or more program modules, and/or other executable instructions.

The input/output interface 174 operates to receive user input, to provide system output, or a combination of both. User input may be provided via, for example, a keyboard/keypad, a microphone, soft keys, icons, or soft buttons on a touch screen (on, for example, the display screen 176), a scroll ball, a mouse, buttons, and the like. The input/output interface 144 may also include other input mechanisms, which for brevity are not described herein and which may be implemented in hardware, software, or a combination of both. The display screen 176 is a suitable display such as, for example, a liquid crystal display (LCD) touch screen, or an organic light-emitting diode (OLED) touch screen. In alternative embodiments, the display screen 176 may not be a touch screen. The input/output interface 174 provides system output via, among other things, the display screen 176.

In exemplary embodiments described herein, the input/output interface 174 includes a graphical user interface (GUI) (for example, generated by the display processor 170, from instructions and data stored in the memory 142, and presented on the display screen 176) that enables a user to interact with the display device 113.

As illustrated, the transceiver 178 establishes, using antenna 180, a wireless data connection 168 with the ECU 112 using a suitable wireless modality, for example, a short-range wireless network protocol (for example, a Bluetooth® standard protocol). In alternative embodiments, the ECU 112 and the display device 113 are coupled with a wired connection.

In one exemplary embodiment, the display device 113 is a smart telephone. In alternative embodiments, the display device 113 may be a table computer, a laptop computer, or another suitable portable electronic device. In some embodiments, the display device 113 is integrated into an automotive system, for example, in a human machine interface that includes a display (for example, an instrument cluster, a mirror with an integrated display, a heads-up display, or touch-screen display). In other embodiments, the display device 113 may be an electronic device dedicated to the system 100.

Figure 5:
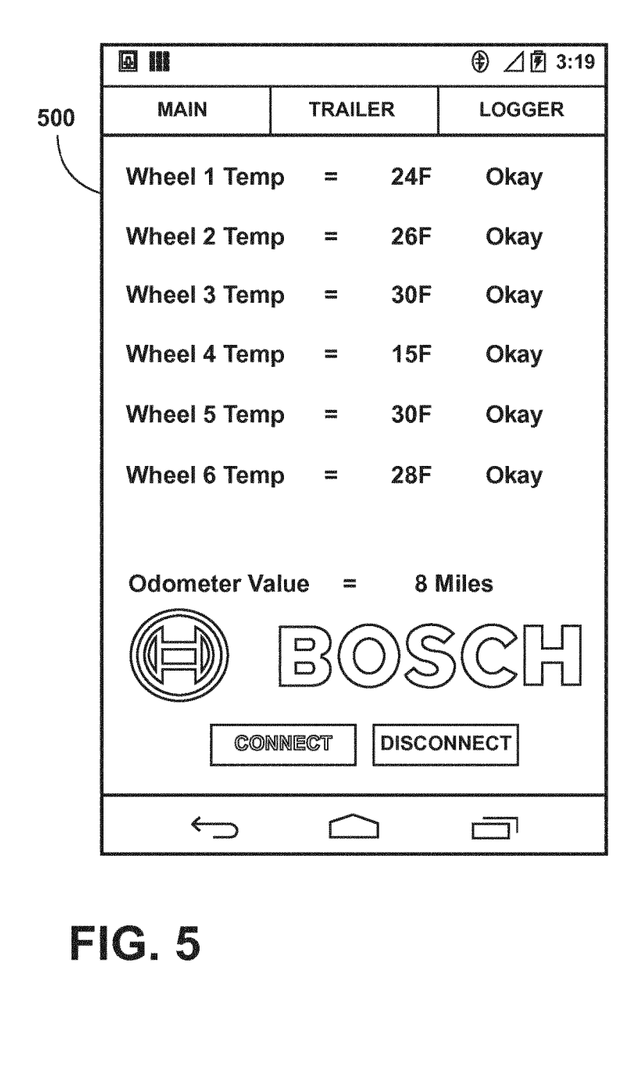
FIGS. 5 and 6 illustrate embodiments of screens produced by the display device of FIG. 4.

The display processor 170 is configured to receive information from the ECU 112, and generate information to display on the display screen 176 using, for example, a GUI. In one exemplary interface screen 500, as illustrated in FIG. 5, the display device lists each of the wheels of a trailer 102, the temperatures corresponding to each wheel, and an indication that each temperature is 'Okay' (that is, within acceptable operating limits). The display device also shows an odometer value for the trailer, indicating that the ECU 112 has tracked 8 miles of travel for the trailer.

Figure 6:
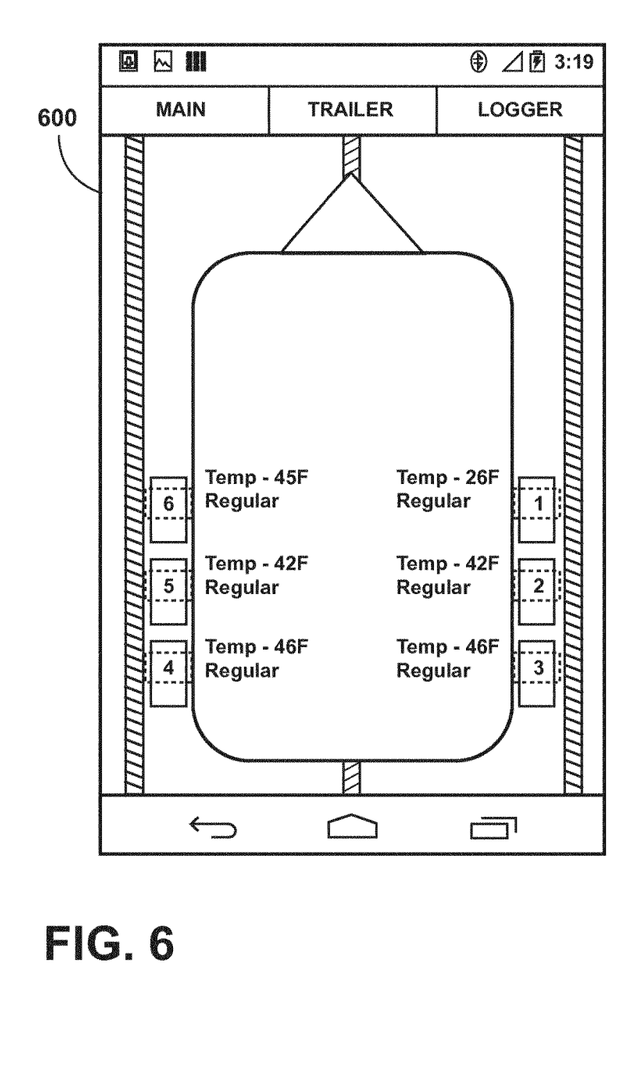

FIG. 6 illustrates an exemplary interface screen 600, which displays the same information as FIG. 5, but in a graphical format that allows an operator to see, at a glance, which wheel, if any, is overheating. For example, wheels operating within an acceptable range may be highlighted in green. Wheels operating outside the acceptable range may be highlighted in red.

Figure 7:
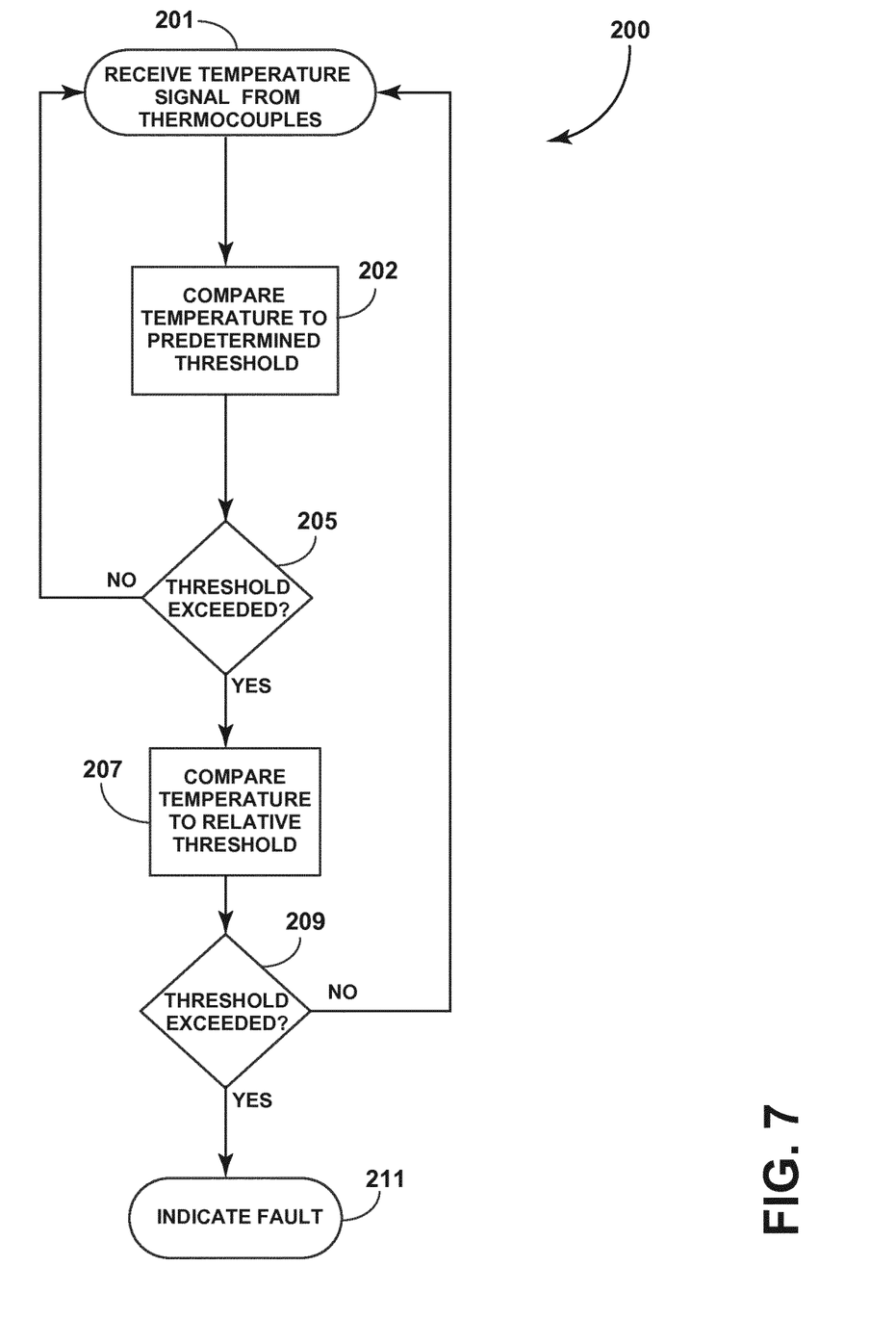
FIG. 7 is a flow chart of a method for operating the system of FIG. 2, according to some embodiments.

FIG. 7 is a flowchart illustrated an exemplary method 200 for monitoring the temperature of wheel hubs in a trailer. As an example, the method 200 is explained in terms of one of the wheel hubs 106 of the trailer 102, which has three axles and six wheel hubs (See FIG. 2). In other embodiments, the method 200 may be used with multiple wheel hubs and trailers having other quantities of axles. At block 201, the ECU 112 receives a signal indicative of a temperature from a thermocouple 108. At block 202, the ECU 112 compares the temperature to a predetermined threshold. The threshold is the temperature, above which the wheel hub 106 would not operate under ordinary conditions (i.e., the lubricant is present in sufficient quantities, and not contaminated or broken down). The threshold will vary based on factors including, for example, the size of the wheel hub 106, the weight of the trailer 102, and the quantity of axles 104. In some embodiments, the threshold may be determined experimentally for particular combinations of axle, wheel, and trailer. At block 205, when the threshold has not been exceeded, the ECU 112 continues to receive temperature signals at block 201.

When the threshold is exceeded, the ECU 112 compares the temperature to a relative threshold, at block 207. The trailer 102 operates in various ambient temperature conditions, which may affect the temperature of the wheel hub 106. For example, if outdoor temperatures are high, the thermocouples may sense higher than acceptable temperatures because the warm air has raised the temperature of the trailer 102 and its components, including the wheel hubs 106. Accordingly, in some embodiments, the ECU 112 may determine whether the temperature of the wheel hub 106 is high compared to both an absolute threshold, and also to a relative threshold. The relative threshold may be based on an average temperature (for example, the average of the sensed temperatures of all the wheel hubs 106 on the trailer 102), a median temperature of the wheel hubs 106, the ambient temperature near the trailer 102, or some combination of the foregoing.

At block 209, if the relative threshold is not exceeded, the ECU 112 will continue to receive and analyze temperature signals at block 201. If the relative threshold is exceeded, the ECU 112 will indicate a fault at block 211. In one exemplary embodiment, a fault is indicated by sending a fault command to the display device 113 to display an alert such as, for example, a visual indicator, such as a flashing red light on an image of a trailer in the location of the wheel hub, which wheel hub's temperature exceeds the threshold. In alternative embodiments, the fault indication may be a visual indicator, an audio indicator, a haptic indicator, some other suitable form of alert, or some combination of the foregoing.

It should be noted that, while excessive heat can indicate the need to replace the wheel hub lubricant 116, wheel hub lubricant 116 should be changed at regular intervals to ensure that it provides maximum protection for the wheel hub 106 (See FIG. 3). Accordingly, embodiments of the invention use an odometry sensor (for example, the wheel speed sensor 110, the GPS 160, or the accelerometer 164) to generate odometry data to track the distance the trailer has traveled. The odometry data is stored in a non-volatile memory of the ECU 112, and can be transmitted to, and displayed by, the display device 113, for example, as an odometer value. This allows an operator of the trailer to keep track of the distance traveled since the last wheel hub lubricant 116 change. In some embodiments, the ECU 112 or the display device 113 may generate an alert when the odometer value exceeds a predetermined threshold (for example, 12,000 miles). The threshold may be determined based on recommend maintenance intervals specified by the trailer manufacturer, the lubricant manufacturer, or both.

Thus, the invention provides, among other things, systems and methods for monitoring wheel hub temperatures and odometry in trailer axles.

What is claimed is:

1. A wheel hub monitoring system for a trailer, the system comprising:
    a spindle;
    an inner bearing;
    an outer bearing;
    a wheel hub engaging the spindle via the inner and outer bearings;
    a thermocouple positioned within the spindle substantially equidistant to the inner bearing and the outer bearing; and
    an electronic control unit, electrically coupled to the thermocouple and configured to
    receive from the thermocouple, a signal indicative of a temperature based on a temperature of the inner bearing and a temperature of the outer bearing; compare the temperature to a predetermined threshold; and
        when the temperature exceeds the predetermined threshold, indicate a fault.

2. The system of claim 1, wherein the predetermined threshold is based on at least one of a group consisting of a size of the wheel hub, a weight of the trailer, and a quantity of axles on the trailer.

3. The system of claim 1, wherein the electronic control unit is further configured to
    when the temperature exceeds the predetermined threshold,
    compare the temperature to a relative threshold, and
    when the temperature exceeds the relative threshold, indicate a fault.

4. The system of claim 3, wherein the relative threshold is based on at least one of a group consisting of an average temperature, a median temperature, and an ambient temperature.

5. The system of claim 1, wherein the electronic control unit is further configured to
    establish, via a transceiver, a wireless data connection with a display device; and
    transmit, via the wireless data connection, a fault command to the display device to indicate a fault.

6. The system of claim 5, wherein the wireless data connection is a Bluetooth connection.

7. The system of claim 5, further comprising:
    an odometry sensor;
    wherein the electronic control unit is further configured to
        receive, from the odometry sensor,
        odometry data for the trailer; and
        transmit, to the display device, the odometry data.

8. A method for monitoring a wheel hub of a trailer, the method comprising:
    receiving, by an electronic control unit, from a thermocouple positioned within a spindle substantially equidistant to an inner bearing of the spindle and an outer bearing of the spindle, a signal indicative of a temperature based on a temperature of the inner bearing and a temperature of the outer bearing;
    comparing the temperature to a predetermined threshold; and
    when the temperature exceeds the predetermined threshold, indicating a fault.

9. The method of claim 8, wherein comparing the temperature to a predetermined threshold includes comparing the temperature to at least one of a group consisting of a size of the wheel hub, a weight of the trailer, and a quantity of axles on the trailer.

10. The method of claim 8, further comprising:
    when the temperature exceeds the predetermined threshold,
        comparing the temperature to a relative threshold, and
            when the temperature exceeds the relative threshold, indicating a fault.

11. The method of claim 10, wherein comparing the temperature to a relative threshold includes comparing the temperature to at least one of a group consisting of an average temperature, a median temperature, and an ambient temperature.

12. The method of claim 8, further comprising:
    establishing, via a transceiver, a wireless data connection with a display device; and
    transmitting, via the wireless data connection, a fault command to the display device to indicate a fault.

13. The method of claim 12, wherein establishing a wireless data connection includes establishing a Bluetooth connection.

14. The method of claim 12, further comprising:
    receiving, from an odometry sensor, odometry data for the trailer; and
    transmitting, to the display device, the odometry data.

15. A display device, the device comprising:
    a transceiver;
    a display screen; and
    a display processor coupled to the transceiver and the display screen, and configured to establish a wireless data connection with an electronic control unit;
    receive, from the electronic control unit, a fault command based on a temperature based on a temperature of an inner bearing of the spindle and a temperature of the outer bearing of the spindle determined by a thermocouple positioned in a spindle corresponding to a wheel hub, substantially equidistant to the inner bearing and the outer bearing; and
    display, on the display screen, a fault indication based on the fault command.

16. The display device of claim 15, wherein the fault indication is at least one selected from a group consisting of a visual indicator, an audio indicator, and a haptic indicator.

17. The display device of claim 15, wherein the wireless data connection is a Bluetooth connection.

18. The display device of claim 15, wherein the display processor is further configured to
  receive, from the electronic control unit, odometry data; and
    display, on the display screen, the odometry data.

* * * * *